(12) United States Patent
Chen et al.

(10) Patent No.: US 11,244,504 B2
(45) Date of Patent: Feb. 8, 2022

(54) SEMANTIC FUSION

(71) Applicant: Facebook Technologies, LLC, Menlo Park, CA (US)

(72) Inventors: Yu Fan Chen, Redmond, WA (US); Richard Andrew Newcombe, Seattle, WA (US); Lingni Ma, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/403,421

(22) Filed: May 3, 2019

(65) Prior Publication Data

US 2020/0349763 A1 Nov. 5, 2020

(51) Int. Cl.
*G06T 7/174* (2017.01)
*G06T 17/20* (2006.01)
*G06T 7/73* (2017.01)
*G06N 3/08* (2006.01)

(52) U.S. Cl.
CPC ............ *G06T 17/205* (2013.01); *G06N 3/08* (2013.01); *G06T 7/174* (2017.01); *G06T 7/73* (2017.01)

(58) Field of Classification Search
CPC ......... G06T 17/205; G06T 7/73; G06T 7/174; G06N 3/08
See application file for complete search history.

(56) References Cited

U.S. PATENT DOCUMENTS

| 2016/0004811 | A1* | 1/2016 | Somasundaram | G06T 7/11 703/11 |
| 2018/0189974 | A1* | 7/2018 | Clark | G06T 7/536 |
| 2019/0043203 | A1 | 2/2019 | Fleishman | |

OTHER PUBLICATIONS

Li, P., Qin, T., Shen, S., Stereo Vision-based Semantic 3D Object and Ego-motion Tracking for Autonomous Driving, Sep. 2018, European Conference on Computer Vision (ECCV) 2018, pp. 1-16. (Year: 2018).*
International Search Report and Written Opinion for International Application No. PCT/US2020/030693, dated Aug. 31, 2020.
International Search Report and Written Opinion for International Application No. PCT/US2020/030693, dated Jul. 8, 2020.
Salas-Moreno, et al., Dense Planar SLAM, XP055140024, DOI: 10.1109/ISMAR.2014, 8 pages.

(Continued)

*Primary Examiner* — Said Broome
(74) *Attorney, Agent, or Firm* — Baker Botts L.L.P.

(57) ABSTRACT

In one embodiment, a computing system accesses a plurality of images captured by one or more cameras from a plurality of camera poses. The computing system generates, using the plurality of images, a plurality of semantic segmentations comprising semantic information of one or more objects captured in the plurality of images. The computing system accesses a three-dimensional (3D) model of the one or more objects. The computing system determines, using the plurality of camera poses, a corresponding plurality of virtual camera poses relative to the 3D model of the one or more objects. The computing system generates a semantic 3D model by projecting the semantic information of the plurality of semantic segmentations towards the 3D model using the plurality of virtual camera poses.

18 Claims, 11 Drawing Sheets
(7 of 11 Drawing Sheet(s) Filed in Color)

(56) References Cited

OTHER PUBLICATIONS

Runz, et al., MaskFusion: Real-Time Recognition, Tracking and Reconstruction of Multiple Moving Objects, 2018 IEEE International Symposium on Mixed and Augmented Reality (ISMAR), IEEE, XP033502065, pp. 10-20, 2018.

Hoang, et al., High-quality Instance-aware Semantic 3D Map Using RGB-D Camera, XP055705587, 8 pages, Mar. 26, 2019.

* cited by examiner

SEMANTIC FUSION

TECHNICAL FIELD

This disclosure generally relates to controls and interfaces for user interactions and experiences in a virtual reality environment.

BACKGROUND

Virtual reality is a computer-generated simulation of an environment (e.g., a 3D environment) that users can interact with in a seemingly real or physical way. A virtual reality system, which may be a single device or a group of devices, may generate this simulation for display to a user, for example, on a virtual reality headset or some other display device. The simulation may include images, sounds, haptic feedback, and/or other sensations to imitate a real or imaginary environment. As virtual reality becomes more and more prominent, its range of useful applications is rapidly broadening. The most common applications of virtual reality involve games or other interactive content, but other applications such as the viewing of visual media items (e.g., photos, videos) for entertainment or training purposes are close behind. The feasibility of using virtual reality to simulate real-life conversations and other user interactions is also being explored.

SUMMARY OF PARTICULAR EMBODIMENTS

Disclosed herein are a variety of different ways of rendering and interacting with a virtual (or augmented) reality environment. A virtual reality system may render a virtual environment, which may include a virtual space that is rendered for display to one or more users. The users may view and interact within this virtual space and the broader virtual environment through any suitable means. In particular embodiments, the virtual reality system may generate a virtual space to present to the user. As an example and not by way of limitation, the virtual reality system may generate a virtual arena to place the user within. In particular embodiments, to provide a better understanding of the virtual space to the user, the virtual reality system may label the objects within the environment. The label may be a description of the object (e.g., a chair, desk, etc.), a color coding corresponding to the type of object or what kind of object it is, a bounding box to identify an object, and other kind of labeling schemes. Additionally to providing labels, the system may generate a mask to be projected to the objects within the environment. While this visual representation of the various objects provide insight, they also help the virtual reality system by ensuring the integrity of the environment is maintained. A user may annotate and fix any misidentified objects. For instance, if a rug was misidentified as the floor. The maintenance of identification of objects ensures the virtual reality system may accurately render any environment for the user through training a model. A semantic model may be trained to identify certain objects and how they fit into a virtual reality environment. For example, multiple objects may correspond to various semantic sets like furniture. If a user wants to reorganize furniture within a virtual reality environment, he or she can quickly remove the furniture to rearrange though the use a filtering tool. However, that filtering tool would not work properly unless the objects are correctly identified and grouped into the appropriate semantic sets. Other applications may include projecting augmented reality elements within a real-world view. The virtual reality system may have to identify objects in order to appropriately interface the real-world. For instance, a user may want to place a generated table within a real-world view of a dining room area. The dining room area may have a rug and hardwood floor. In order to accurately place the generated table, the virtual reality system would have to identify the separate objects of the floor and the rug. This may be achieved through building a semantic model that correctly identifies objects within a scene through generating a plurality of segmentations that provides information corresponding to identified objects.

To generate a 3D semantic model, in particular embodiments, the virtual reality system may access a plurality of images captured by one or more cameras from a plurality of camera poses. As an example and not by way of limitation, the images may be captured from a real-world environment, such as an office environment. As another example and not by way of limitation, the images may be generated or accessed from a store of images. In particular embodiments, the virtual reality system may use the images to generate a plurality of semantic segmentations that comprise semantic information of the objects captured within the images. Although semantic segmentations and semantic information is discussed, other types of segmentations and information may be generated using the images. In particular embodiments, the virtual reality system may access a three-dimensional (3D) model of the objects. As an example and not by way of limitation, the virtual reality system may generate a 3D model of the objects based on the captured images by rendering a 3D model. In particular embodiments, the virtual reality system may determine, using the camera poses, a corresponding plurality of virtual camera poses relative to the 3D model of the objects. In particular embodiments, the virtual reality system may generate a semantic 3D model by projecting the semantic information of the plurality of semantic segmentations towards the 3D model using the plurality of virtual camera poses.

Disclosed herein are a variety of different ways of rendering and interactive with a virtual (or augmented) reality environment. A virtual reality system may render a virtual environment, which may include a virtual space that is rendered for display to one or more users. The users may view and interact within this virtual space and the broader virtual environment through any suitable means. One goal of the disclosed methods is to provide an intuitive interface for users-one that gives the users a sense of "presence," or the feeling that they are actually in the virtual environment.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

Semantic scene understanding can be a fundamental problem in computer vision, robotics and graphics. To facilitate the research, large-scale high-quality ground truth datasets are crucial to data-hungry algorithms, such as deep learning. While large-scale semantic RGB-D datasets have an impressive scale, little work focuses on how to efficiently obtain detailed annotations that also preserve consistency between multi-view 2D images and 3D reconstruction. As such, a tool may be required to enable humans to annotate directly on 3D meshes and enable cleanup of mesh geometry to enhance semantic propagation between 2D and 3D. Aiming for large-scale ground truth collection, a closed-loop workflow, that learns from existing semantic segmentations to bootstrap future annotations may assist with these functionalities.

Existing annotations may often be contaminated with labeling noise, the correspondence between 2D and 3D labels may be either absent or inconsistent, and it may difficult to obtain detailed annotations that respect object boundaries. Additionally, 3D datasets may heavily rely on structured light depth sensor for dense reconstruction. Because of occlusions and lack of coverage and sensor limitations, missing surfaces may be common in the reconstruction. This fact may lead to erroneous data associations when projecting 3D to 2D image space and vice versa. This may severely limit the use of semantic 3D datasets to train and benchmark 2D machine learning algorithms. With the aim of large-scale annotations, annotation efficiency can be an important concern. Along those lines, existing annotations can assist further labeling. The workflow described herein may provide a segmentation-aided free-form mesh labeling algorithm, which yields hierarchical annotation with better detail and efficiency; a human-aided geometry correction technique to insert missing surfaces to enhance 2D/3D association; a closed-loop bootstrapping annotation scheme, which trains instance semantic annotations from annotated data, and integrates the predictions back into a mesh segmentation.

In particular embodiments, the reconstruction amended by using the method described herein may reduce rendering faults and produce better ground truth annotation. In comparison to the state-of-the-art segmentation-based algorithm, our annotated model may render 2D label images that gives approximately 20% better accuracy. In particular embodiments, a plurality of images may be captured and used to learn semantic instance prediction in those images with segmentation algorithms. As an example and not by way of limitation, Mask-RCNN may be used for the process of learning semantic instance prediction.

Figure 1A:
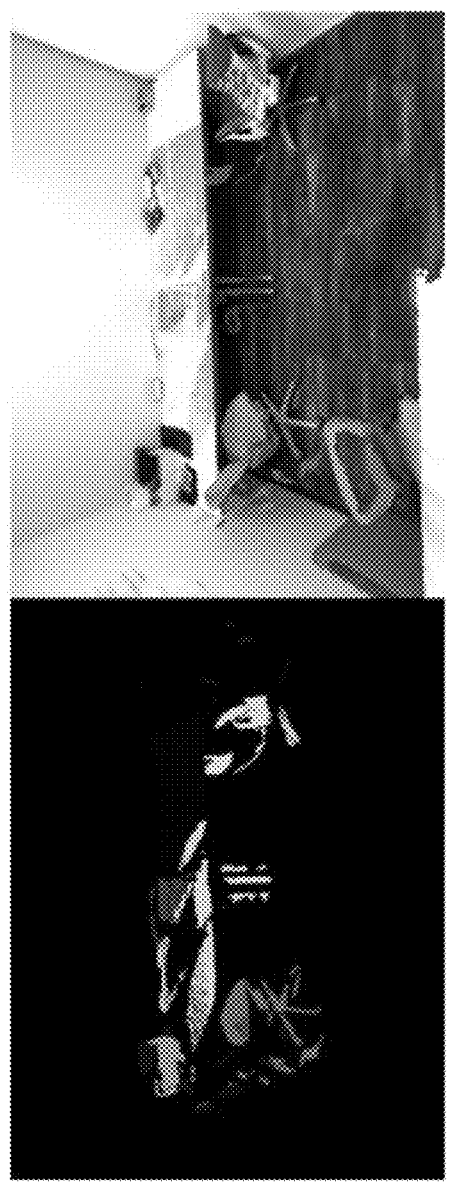
FIGS. 1A-IC illustrate example processes of performing segmentations to utilize in a semantic fusion algorithm.
Figure 1A:

Referring to FIG. 1A, a first part of a semantic fusion process 100 is shown. In particular embodiments, a system may perform the semantic fusion process 100 as described herein. As an example and not by way of limitation, a virtual reality system may perform the semantic fusion process 100. The process 100 begins with a camera view at a particular camera pose shown in the image 102. In particular embodiments, the system may perform a segmentation process on the image 102. As an example and not by way of limitation, the system may use a Mask-RCNN algorithm to identify objects within the image 102 and generate information corresponding to the objects within the first image 102. In particular embodiments, the various segmentations the system may perform may comprise a geometry-based segmentation, an instance segmentation, and a semantic segmentation. In particular embodiments, the geometry-based segmentation may identify several objects and geometric information of those objects within the image 102. In particular embodiments, the instance segmentation may identify instances of different objects and assign object identification to each of those objects. These assignments of object identification may be soft assignments that may be determined in a further process. For instance, within the image 102, separate instances of identified different objects may be marked in different colors. The prediction of the different objects may not always be correct. For example, there is a chair identified in image 102 that has an orange section and a yellow-green section. These sections may be a mask applied to the image 102 as a prediction of the separate instances of objects within the image 102. As a result of some of the incorrect identifications, the semantic fusion process 100 aggregates the information from a plurality of images to correctly identify objects within an environment. In particular embodiments, the semantic segmentation may generate semantic information with each identified object within the image 102. As an example and not by way of limitation, a chair may be identified, and a green mask applied to it which identifies the object as a chair. In particular embodiments, the system may project the information gathered from a segmentation onto a 3D model of the environment and/or objects. The projection may be a mask applied to the 3D model. In particular embodiments, the 3D model of the environment and/or objects may be generated based on a plurality of images. The system may project the instance level segmentation information gathered from the image 102 onto the 3D model as shown in image 104. The instance level segmentation information may not provide a complete picture of what the environment is, but only what was captured in image 102. As such, for instance, since a chair was identified as two different objects, the instance level segmentation information may show the different instances of objects in different colors as shown in image 104. Similarly, the semantic level segmentation information may be projected to the 3D model as shown in image 106. By correctly identifying objects, the system may label objects within a 3D model correctly based on what was captured and generated from image 102. As shown in image 106, since only partial information was gathered, only information related to what was captured in image 102 may be projected to the 3D model as shown in image 106.

Figure 1B:
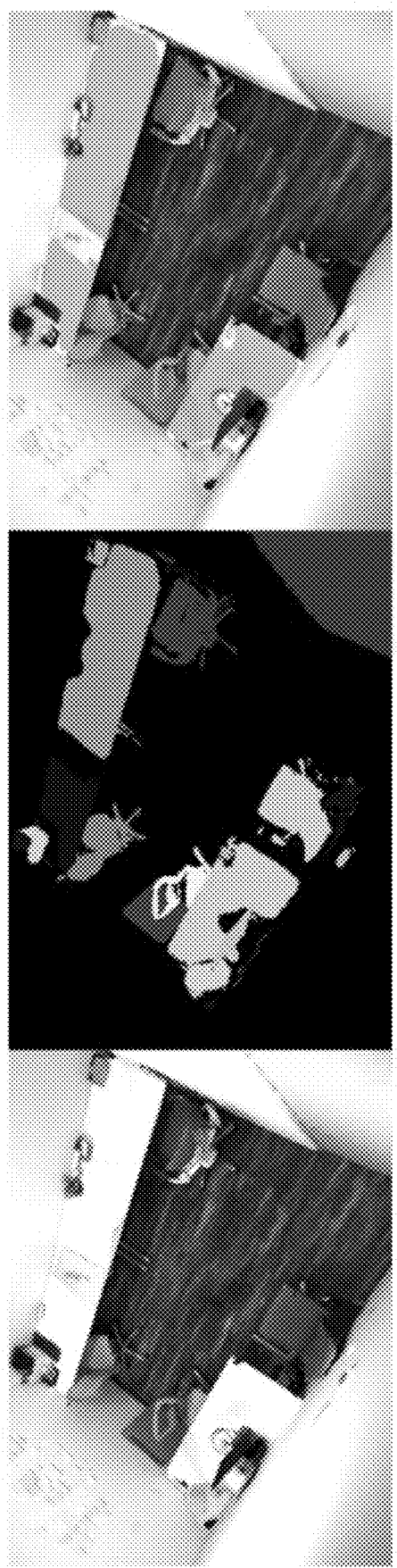

Referring to FIG. 1B, an example result of the semantic fusion process 100 is shown. In particular embodiments, the system may access a plurality of images captured by one or more cameras from a plurality of camera poses to generate a plurality of segmentations that comprise information corresponding to the objects within the images. In particular embodiments, the system may combine this information to project the information from the plurality of segmentations onto the 3D model. A 3D model scene of an office may be captured in image 108a, where the system has accessed images corresponding to the scene in multiple camera poses to generate segmentations. The information gathered from the multiple segmentations may provide a more complete picture through the understanding of the different objects within the environment. In particular embodiments, the system may project instance level segmentation information onto the 3D model in image 110a, which appears to be more complete than image 102 because it combines the information gathered from a plurality of images. For example, more complete shapes are shown, like a green chair or a blue chair. Similarly, in particular embodiments, the system may project the semantic level segmentation information onto the 3D model in image 112. As an example and not by way of limitation, all chairs may be projected a green mask to represent they have the same semantic meaning (e.g., they are chairs). In particular embodiments, the system may determine using the plurality of camera poses of the captured images, a corresponding plurality of virtual camera poses relative to the 3D model. In particular embodiments, the virtual camera poses may be used to project information from segmentations onto the 3D model. As an example and not by way of limitation, the system may generate a semantic 3D model by projecting the semantic information of the plurality of semantic segmentations towards the 3D model using the virtual camera poses as shown in image 112. As another example and not by way of limitation, the system may generate an instance 3D model by projecting the object identification of the plurality of instance segmentations towards the 3D model using the plurality of virtual camera poses as shown in 110a. In particular embodiments, generating the instance 3D model may comprise combining object identification from each of the instance segmentations to apply to one or more objects in the 3D model.

Figure 1C:

Referring to FIG. 1C, another example result of the semantic fusion process 100 is shown. In particular embodiments, the system may similarly to FIG. 1B, access a plurality of images captured by one or more cameras from a plurality of camera poses to generate a plurality of segmentations that comprise information corresponding to the objects within the images. Another 3D model scene of an office may be captured in image 108b, where the system has accessed images corresponding to the scene in multiple camera poses to generate segmentations. In particular embodiments, the 3D model scene may be rendered based on a plurality of images captured of a real-world environment. In particular embodiments, the system may project instance level segmentation information onto the 3D model in image 110b. In particular embodiments, the system may project semantic level segmentation information onto the 3D model in image 114. The semantic information may also comprise bounding boxes corresponding to the object as well. In particular embodiments, the bounding boxes may be a tighter fit in relation to the object. In particular embodiments, the orientation of the bounding boxes may be adjusted to be flush with the floor of the 3D model scene. In particular embodiments, the system may identify the floor, walls, and ceilings as separate objects.

Figure 2A:
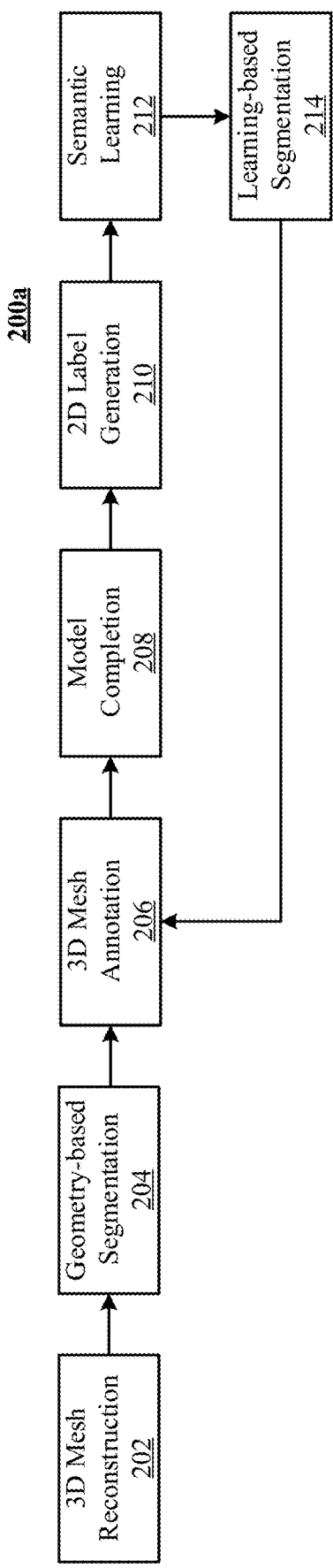
FIGS. 2A&2B illustrate example flowcharts of a semantic fusion process.
Figure 2B:
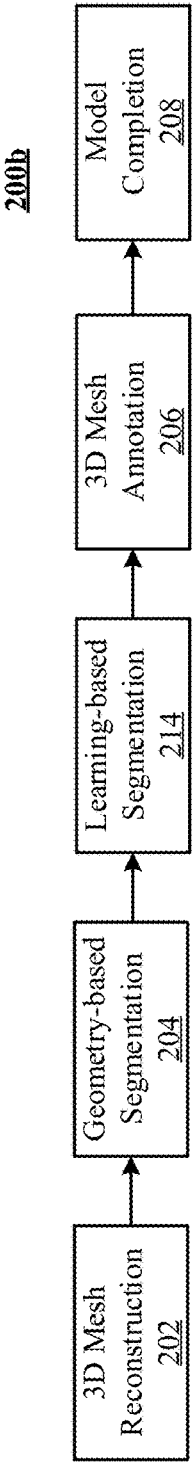

FIGS. 2A & 2B illustrate example flowcharts 200 to generate large-scale semantic annotations in 3D. Referring to FIG. 2A, in particular embodiments, first, the system may access 3D meshes for 3D mesh reconstruction 202 and may compute geometry-based segmentations 204 to assist annotation. In particular embodiments, initially, an annotator may then refine and semantically annotate the pre-segmentation using free-form mesh painting in 3D mesh annotation 206. In particular embodiments, the annotation may be done by the system or a human annotator. In particular embodiments, the process 200a may continue to model completion 208. Then, the annotated meshes may be rendered to obtain fully annotated 2D sequences in 2D label generation 210, which may be used to train deep learning algorithms for semantic understanding in semantic learning 212. In particular embodiments, given enough human segmented and annotated meshes, the loop may close by using the trained model to infer semantics in image space and fusing these prediction into a consistent segmentation on the 3D mesh with learning-based segmentation 214.

Referring to FIG. 2B, after subsequently training the model, the system may utilize process 200b to generate large-scale annotations in 3D. In particular embodiments, the system may access 3D meshes for 3D mesh reconstruction 202 and may compute geometry-based segmentations 204 to assist annotation. In particular embodiments, the system may perform learning-based segmentation 214 and then perform 3D mesh annotation from the information gathered from the learning-based segmentation 214. In particular embodiments, the system may perform model completion 208 after annotating the 3D mesh. In particular embodiments, the system may continue to perform process 200*a* after training the model to continue to train the model.

Figure 3A:
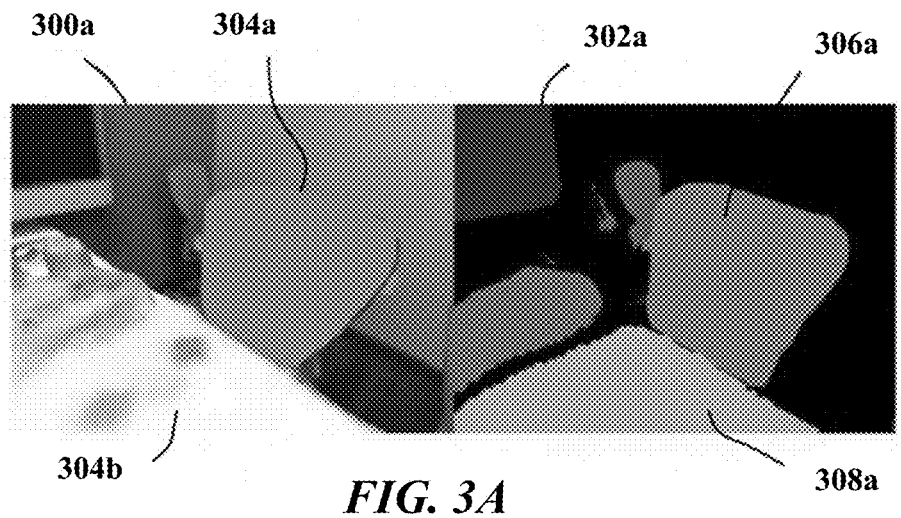
FIGS. 3A-3C illustrate another example process of performing segmentations to utilize in a semantic fusion algorithm.
Figure 3B:
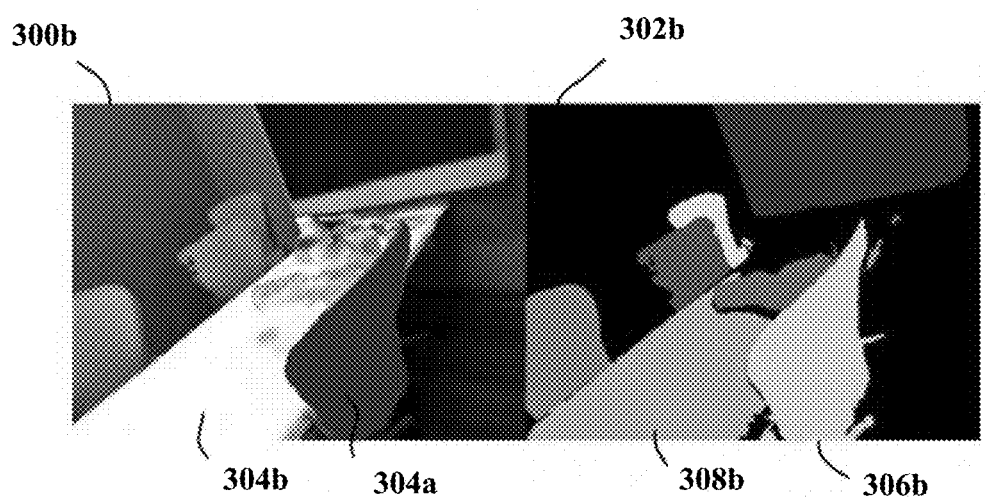
Figure 3C:
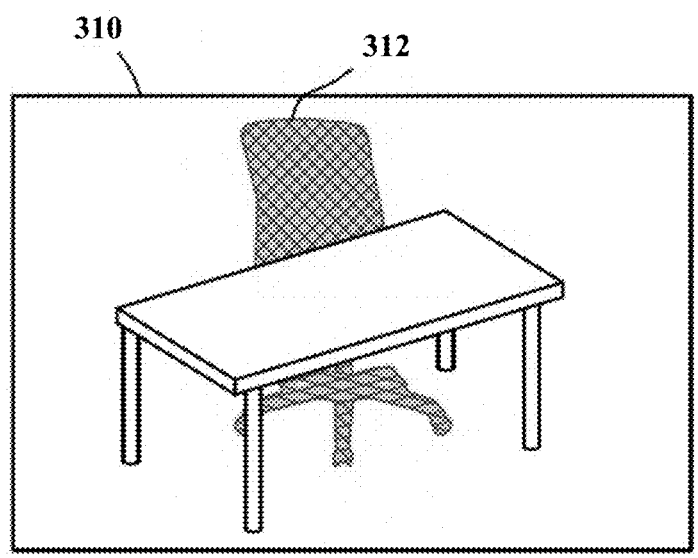

Referring to FIGS. 3A-3C, example semantic segmentation processes are shown to perform a semantic fusion process. FIG. 3A illustrates an example segmentation process. In particular embodiments, the system may access an image 300*a* of objects 304. In particular embodiments, the objects 304 may be a part of a rendered 3D scene, a real-world scene, or the like. In particular embodiments, the system may perform a semantic segmentation on the image 300*a* and project the semantic level segmentation information onto the objects 304 as shown in image 302*a*. In particular embodiments, the system may apply a mesh 306*a* and 308*a* onto objects 304*a* and 304*b*, respectively. In particular embodiments, the mesh 306*a* and 308*a* may provide semantic meaning corresponding to their respective objects 304. As an example and not by way of limitation, the mesh 306*a* may indicate that the object 304*a* is a chair. Referring to FIG. 3B, the system may access another image 300*b* of the objects 304. The image 300*b* may be from another camera pose of the same objects 304. In particular embodiments, the system may perform a semantic segmentation on the image 300*b* and project the semantic level segmentation information onto the objects 304 as shown in image 302*b*. In particular embodiments, the system may apply a mesh 306*b* and 308*b* onto the objects 304. In particular embodiments, the system may perform the process of accessing images and perform segmentation on the images to generate an annotated 3D model. As an example and not by way of limitation, the system may perform semantic segmentations on a plurality of images and generate a semantic 3D model from the plurality of semantic segmentations. Referring to FIG. 3C, the system may apply a 3D mesh 312 onto the chair as shown in image 310. In particular embodiments, the semantic 3D model may be generated based on the combination of the semantic information from the semantic segmentations performed in images 302*a*, 302*b*. While in a first camera pose, a front of the chair is seen and labeled as a chair, a second camera pose may identify the back of the chair as a chair. Typically it would be highly difficult or impossible to see both the front and back of a chair within a single image. As such, in a 3D model, the system may appropriately generate a semantic 3D model by combining the semantic information gathered from separate segmentations.

Figure 4B:
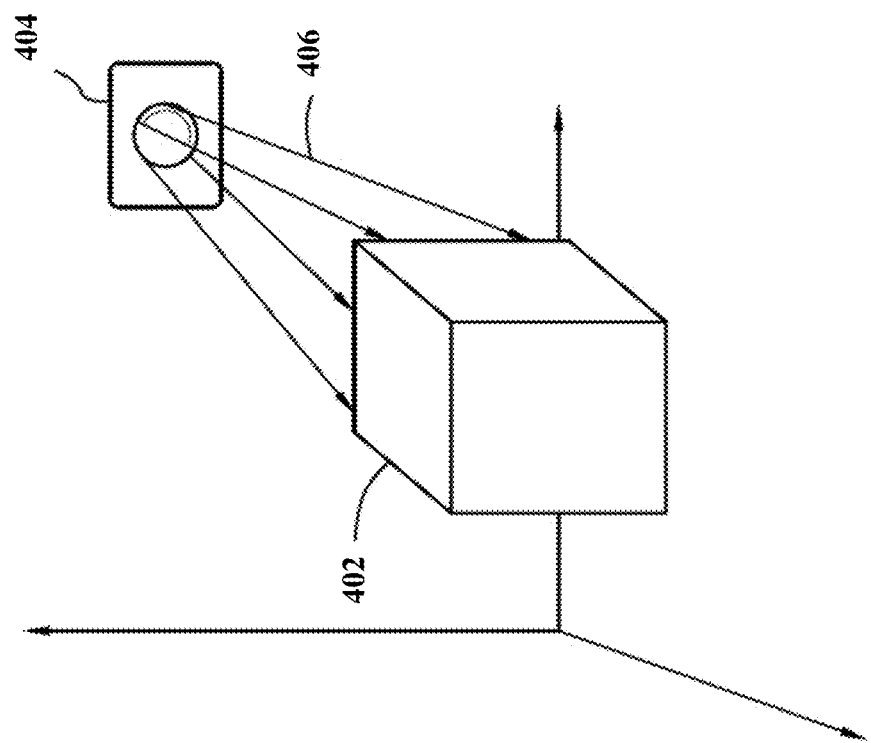
FIGS. 4A&4B illustrate an example projection process of semantic information.
Figure 4A:
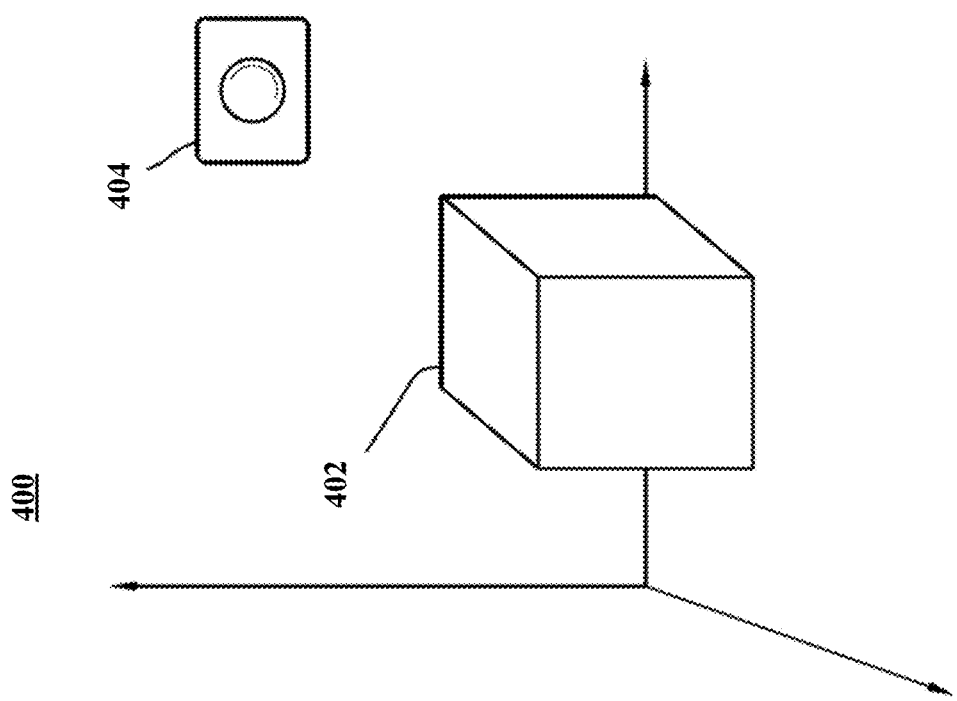

Referring to FIGS. 4A & 4B, an example process 400 of projecting information onto an object within a 3D scene. Referring to FIG. 4A, an object 402 is captured within a 3D scene with a camera 404. The camera 404 may be in a particular camera pose viewing the object 402 within the 3D scene. Referring to FIG. 4B, the camera 404 may project information onto the object 402 through rays 406 that project out from the camera 404 at the particular camera pose. In particular embodiments, the system may perform segmentations to generate information to project onto the object 402. In particular embodiments, the system may compile semantic information, object identification, geometrical information related to the object 402. In particular embodiments, the system may use the camera 404 to project the information onto the object 402 through rays 406. In particular embodiments, the rays 406 may comprise information related to the object. As an example and not by way of limitation, the rays 406 may indicate the object 402 is a cube.

Figure 5:
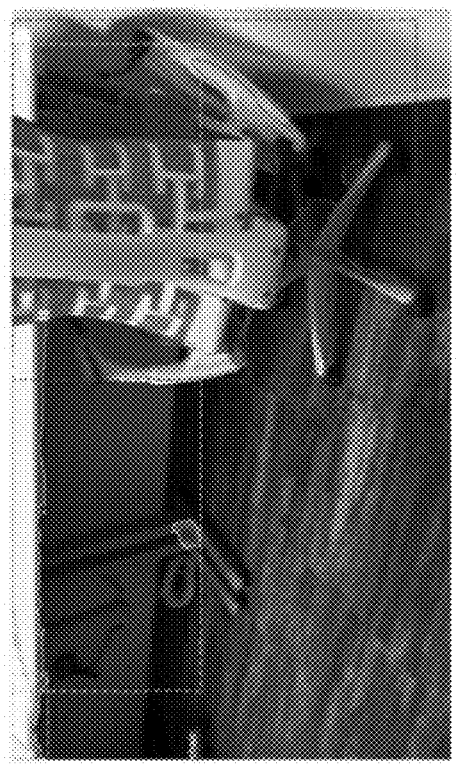
FIG. 5 illustrates an example process of projecting information from separate segmentations to an object.
Figure 5:
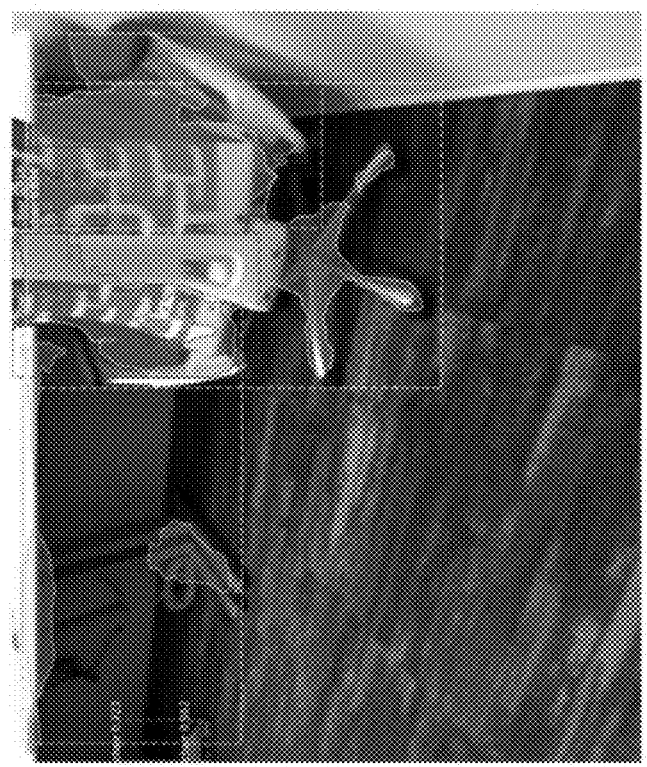

Referring to FIG. 5, another process of generating an annotated 3D model is shown. In particular embodiments, an image 502 shows a chair with information from several segmentations projected onto it. In particular embodiments, the system may perform segmentations and project the information onto the chair shown in different colors. For example a yellow portion may correspond to one segmentation and the red portion may correspond to another segmentation. The system may project the information from the different segmentations and compile the information into a single mask/mesh as shown in image 504. In particular embodiments, the system may generate a red mask to be applied to the chair in the image 504. The red mask may comprise information indicative of the object being a chair.

In particular embodiments, a 3D colored mesh M may be a manifold defined by a set of vertices $V=\{v_i \in R^3\}$, edges $E=\{e_{ij}\}$, and polygon primitives $P=\{p_i\}$. The attributes of a vertex $v_i$ may contain unit normal $n_i \in R^3$, and color $c_i \in R^3$. Mesh M may be partitioned into disjoint segments $M_i$ and assigned to label $\ell_{k,k}$. In particular embodiments, the instance and semantic partition may be denoted by $M^s_i$ and $M^q_i$, respectively. In particular embodiments, the partitions may be generated from a segmentation process. An RGB-D recording may be a sequence $\{S$ of color and depth images $I^t \in R3, D^t \in R, \xi^t \in R^6\}$ with time stamp t. In particular embodiments, the 6DoF rigid body motion $\xi^t$ may be assumed known for each frame. Given a camera model, the projection of a 3D point v onto the 2D image may be denoted by $x=\pi(v)$, with $x \in R2$ and the back-projection by $v=\pi^{-1}(x)$. To compute color distance, CIELab color space may be used instead of RGB, and $\Delta(c_i, c_j)$ may denote the Euclidean color distance in CIELab space.

In particular embodiments, annotation may be a process of a human interacting with a 3D mesh. To compute where an annotators clicks on the mesh, OpenGL may be used to render the polygon index into a frame buffer and read out the index under the mouse position. This solution may be more efficient than ray tracing. Similarly, to obtain 2D labeling from annotated meshes, the label value may be looked up through a rendered primitive index.

In particular embodiments, an annotation algorithm may be used to generate accurate semantic instance labeling on the 3D mesh and 2D renderings from it. In particular embodiments, benefits of the annotation algorithm may be to assist humans to efficiently label semantic objects accurately, ensure label consistency between observations from different viewpoints, and maintain a tight association of 3D reconstruction and 2D images.

To this end, the proposed tool may operate on 3D colored meshes. The algorithm may initialize the annotation with a geometric segmentation. Annotation may be an iterative process between joining segments and changing segments to correctly capture details via free-form painting along the mesh manifold. View rendering may be applied to propagate the annotation results from 3D to 2D. To compensate for rendering errors due to imperfect reconstruction, human-aided geometry completion may be used.

In particular embodiments, the process of annotation may be to create a mapping from primitives to the label domain f: $p_i \rightarrow \ell_j$. When the mapping f is one-to-one, it may be trivial to organize the results. However, considering how annotated models are used in practice, it may be desirable to support a multivalued mapping. As an example and not by way of limitation, a same primitive may be a rug in for one application, and floor for another. Similarly, hierarchical relationships may be fundamental to semantic relationships. As an example and not by way of limitation, almost any object can be broken down into smaller parts or grouped into new categories. To support one-to-many mapping and hierarchical relationships in the segmentation, a semantic tree may be generated as shown in FIG. 6.

Figure 6:
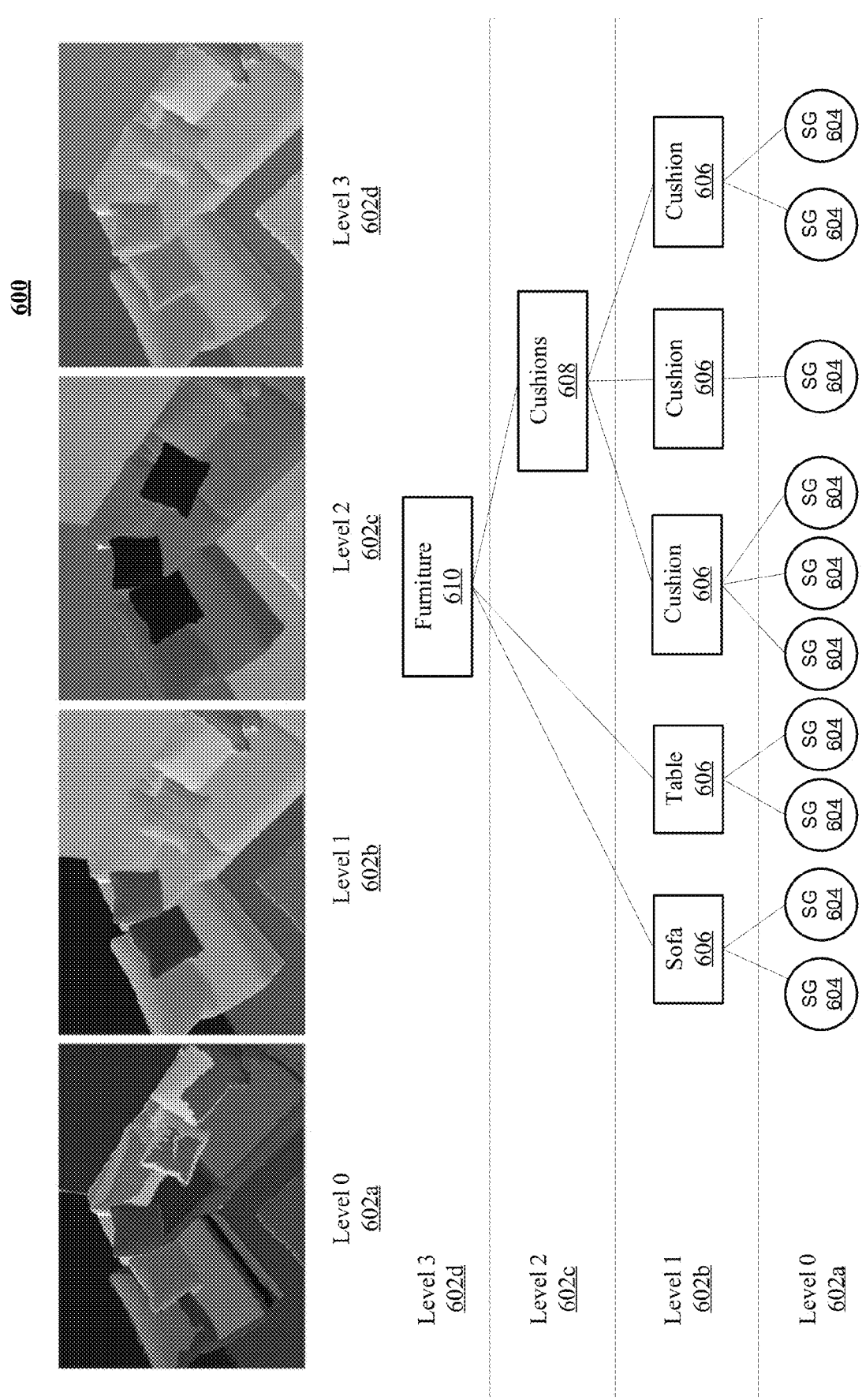
FIG. 6 illustrates an example semantic tree and the different components of the semantic tree.

Referring to FIG. 6, a semantic tree 600 is shown comprising several levels 602. In particular embodiments, leaf nodes may contain sets of primitives that correspond to segments generated either by the pre-segmentation algorithm or free-form painting. These leaves may be connected into a tree to represent different semantics. In particular embodiments, the hierarchy may be defined as follows: level 0 602a represents the aforementioned non-semantic leaf segmentations, level 1 602b represents object instances, level 2 602c represents object classes, level 3 602d and above encodes higher-level semantic sets. With this definition, rendering the tree at different levels naturally yields different aspects of the annotation. This is shown in FIG. 6, up to level 3 of the semantic tree. In particular embodiments, individual instances of objects 606 may comprise one or more non-semantic leaf nodes 604. As an example and not by way of limitation, individual cushions 606, the sofa 606, and table 606 may comprise non-semantic leaf nodes 604. In particular embodiments, an object class 608 may comprise one or more individual instances of an object 606. As an example and not by way of limitation, multiple cushions 606 make up the object class 608 "cushions". That is, in particular embodiments, all objects of the same class make up an object class 608. In particular embodiments, a semantic set 610 may comprise several object classes 608 and individual objects 606. As an example and not by way of limitation, the semantic set 610 "furniture" may comprise the object class 608 "cushions" and all other object instances 606. The objects 606 that are labelled as "furniture" are included in the "furniture" semantic set 610. In particular embodiments, the semantic tree 600 may be generated based on the semantic information accumulated from the semantic segmentations performed on a plurality of images related to the 3D scene. In particular embodiments, each of the semantic levels 602 comprises a threshold amount of semantic information. As an example and not by way of limitation, each object instance 606 in level 1 602b comprises semantic information related to the individual objects. Additionally, the next level 2 602c comprises the semantic information of the lower levels 602 and additional semantic information. In particular embodiments, the system may project the semantic information corresponding to a particular level 602 of the semantic tree 600 to a 3D model. As an example and not by way of limitation, the system may project the semantic information corresponding to level 3 602d, which indicates several objects are a part of the semantic set 610 "furniture".

In particular embodiments, to extract a sensible initial segmentation, a robust planar segmentation algorithm may be used that: (1) runs directional segmentation via the DP-vMF-means algorithm and (2) runs connected component analysis for each of the directional segments along the manifold of the mesh. In particular embodiments, a segment may be classified as planar by analyzing the eigenvalues $\lambda_1 < \lambda_2 < \lambda_3$ of the covariance matrix of all points in the segment. In particular embodiments, a segment may be considered a plane if both $\lambda_1 \ll \lambda_2$ and $\lambda_2 \ll \lambda_3$. Any segments of the mesh that are not classified as planar may be refined via the Felsenszwalb segmentation algorithm. This may lead to a finer segmentation of all non-planar segments more useful for the next step of free-form segmentation adjustment and semantic annotation.

In particular embodiments, to further clean up the resulting segmentation a 3D bilateral filter may be run as the final step in the pre-segmentation. In particular embodiments, the bilateral filter may work along the manifold of the mesh with the following weighting function:

$$\omega_j = \exp\left(-\frac{\Delta(c_j, c_i)^2}{\sigma_c^2} - \frac{|v_j - v_i|^2}{\sigma_c^2}\right) \qquad (1)$$

In many situations, joining segments may not lead to the desired annotation. This may be because 1) boundary of segments often misaligns with the actual object, 2) some segments connect multiple object parts, and 3) heuristic pre-segmentation algorithms fail to distinguish objects, e.g., to separate rug and floor. In particular embodiments, to solve this problem, SceneNN may generate segmentations, and allow annotators to break large segments by switching from coarse to fine segmentation. Therefore, a free-form painting along mesh manifold may be used to refine segments. From a user selected seed primitive, Algorithm 1 may describe a painting method. Algorithm 1 may use region growing along the mesh to locate segments. In particular embodiments, region growing may be regulated with three parameters. Parameter $a_t$ may regulate the smoothness by comparing the normal direction, parameter $d_t$ may limit the Euclidean distance to the seed primitive, and parameter $S_t$ may regulate the color similarity. With a proper combination of these parameters, the region growing may be flexible in selecting any surface patches, from large planar structures to small curved areas. It also may enable extracting detailed texture patterns, such as posters on the wall.

---

ALGORITHM 1: Free-form Painting along Mesh Manifold

1    Input: 3D colored mesh $\mathcal{M}$ and a seed primitive $p_s$
2    Parameter $\alpha_t$ angle threshold, $d_t$ distance threshold, $\delta_t$ color threshold
3    Output: New segment $\mathcal{M}_k$
4    queue; $Q \leftarrow p_s$
5    while $Q \neq \emptyset$ do
6    | pop primitive $p_k$
7    | if $p_k \in \mathcal{M}_k$ then
8    | | continue
9    | $\mathcal{N}_j$ = findNeighboringPrimitives($p_k$)
10    | for each neighbor $p_k$ in $\mathcal{N}_j$ do
11    | | if $|n_k^T n_s| > \cos \alpha_t$ and $\|p_k - p_s\| < d_t$ and $\Delta(c_k, c_s) < \delta_t$ then
12    | | | $Q \leftarrow p_k$; $\mathcal{M}_k \leftarrow p_k$ 13    return $\mathcal{M}_k$ In particular embodiments, the free-form painting may introduce topology changes to the semantic tree. To reflect these changes and to preserve the tree structure, affected tree branches may be detected and their empty twin branches may be created. Leaves affected by painting may be split into two. The unselected primitives remain unchanged, the selected ones may be extracted and transferred to the twin branch.

In particular embodiments, many indoor reconstructions may rely on structure light sensor to obtain dense reconstruction. Due to sensor limitations and imperfect capture coverage, the resultant mesh typically may contain missing surfaces. This may lead to wrong projection, where surfaces behind the missing reconstructions get projected onto 2D images. Comparing the rendered depth to raw depth images may detect some errors, however, depth may not always available. To maintain a tight association between 3D annotations and 2D images, two simple yet effective techniques may be used to repair reconstructions.

In particular embodiments, missing surfaces may often be planar, and so annotators may mark a polygon $B_i$ around a planar hole. The plane equation parameterized by $p_i := (n_i, d)$ may then be estimated by least-square plane fitting, $$\underset{n_i, d}{\text{argmin}} = \sum_{v_i \in \mathcal{B}_i} (n_i^T v_i + d)^2 \qquad (2)$$

To stitch the mesh, the planar patches may be directly integrated into SDF volume which are used to reconstruction the model. To update the voxels around target holes, the SDF value F(v) may be calculated as the distance between voxel between voxel center v and the target plane $$F(v_i) = \frac{W(v_i)F(v_i) + \omega(n^T v_i + d)}{W(v_i) + w} \qquad (3)$$

$$W(v_i) = W(v_i) + \omega$$

Once the SDF values are updated, the mesh may be regenerated via the standard marching cubes algorithm. The augmented polygons may automatically be assigned to the most likely boundary primitive label.

In particular embodiments, to complete the missing surfaces of cylindrical structures, e.g., the partially reconstructed pillars, a technique may be implemented to complete the missing surfaces of cylindrical structures. The idea may be to first estimate the curve of an object's central axis and cross-section shape, and then to complete the missing surfaces by sweeping the cross-section curve along central axis. In particular embodiments, straight dominant supporting structures may cause rendering errors. Instead of estimating the L1-medial axis to approximate central axis, the objects central axis may be estimated. First the dominant principal component may be computed via PCA to approximate the central axis. Then neighboring vertices are projected onto the tangent plane and the cross-section shape may be estimated by fitting a non-uniform rational basis spline (NURBS). Finally the axis may be adjusted to the center of cross-section NURBS. In addition, the sweeping direction may be adjustable by annotators to achieve optimal results.

In particular embodiments, these two techniques may not optimally correct reconstruction faults. However, they may effectively reduce the most common rendering errors and yield better label propagation from 3D model to 2D images.

In particular embodiments, annotation may be an expensive process, therefore, it is important to incorporate machine intelligence to assist the human operator. In particular embodiments, the close-loop annotation scheme may be used to boot-strap large-scale semantic annotation collection. To propagate the understanding from multi-view 2D images to obtain consistent predictions of 3D meshes, a method for multi-view semantic instance fusion onto a 3D mesh may be used. Furthermore, a technique to bridge the gap between vision-based and geometry-based segmentation may be used.

In particular embodiments, the first step towards closing the loop of annotation may be to train machine learning algorithms. In order to train the 2D convolutional neural network, the 3D semantic mesh may be rendered into the corresponding camera view to obtain densely annotated video sequence. Due to the noise and errors in pose estimation, model reconstruction, and camera calibration, the rendered label images may not always fully respect the object boundary in the original color image. The missing labels in mesh annotation and missing surfaces in reconstruction may also contribute to noises in label rendering. To correct these artifacts, 2D joint bilateral filter may be applied to smooth the rendering, while preserving the edges. Similar to 3D bilateral filter, $$\omega_j = \gamma_i \exp\left(-\frac{\Delta(c_j, c_i)^2}{\sigma_c^2} - \frac{|v_j - v_i|^2}{\sigma_v^2} - \frac{|x_j - x_i|^2}{\sigma_c^2}\right), \qquad (4)$$

where $\sigma_c^2$, $\sigma_x^2$ and $\sigma_v^2$ may be the variance in color, 2D pixel coordinate and 3D Euclidean. The weight parameter $\gamma_j$ may be an estimation of rendered label certainty. The rendered label may be more prone to error around object boundaries and label jumps. Therefore, a combined edge map may be estimated as the strong image gradient plus the label boundary. The weighting map γ may then be calculated as the distance towards the nearest edge point and then normalized to the range of [0, 1]. The value γi may also be used to compute a dynamic filter window. Given a maximum window size K, the filter size for pixel i may be given by γjF.

In particular embodiments, the following may develop an approach for computing instance-level semantic segmentation in 3D, which more precisely, may be to find a tuple of semantic and instance ids, $(M^s_i, M^q_i)$, for each primitive pi on a mesh M. Shown in Algorithm 2, the approach may operate in three main phases. First, a Mask-RCNN model may be used to detect objects in each image frame $I^t$ in a raw video capture sequence S (line 5-6). Specially, Mask-RCNN may find a list of object masks {dk}, each of which may be associated with a semantic class ck and a confidence score αk. Using the projection function found during 3D reconstruction, each of the detections in 2D can be mapped onto the 3D mesh (line 8-10). Each mapped detection may consist of the same semantic class $c_k$, a set of face ids $m_k$ on the 3D mesh, and the corresponding confidence score $r_k$ that combines Mask-RCNN's prediction score $a_k$ and the mesh's geometry information (i.e., camera pose with respect to the mesh). In the second phase, the set of individual detections D may be fused together to obtain semantic-level segmentation s as shown in line 10. In the third phase, since each instance may be constrained to have one semantic id, instance-level segmentation can be performed separately for each semantic class $s_k$, as shown in lines 12-16. Details of the latter two phases are presented below.

---

ALGORITHM 2: 3D Instance Segmentation

1  Input: A video sequence S and camera model for projection $\pi$
2    A Mask-RCNN model R : I $\mapsto$ $(c_1, \alpha_1, d_1), \ldots, (c_{In}, \alpha_{In}, d_{In})$
3  Output: Semantic and instance segmentation $\mathcal{M}^s, \mathcal{M}^q$
4  $\mathcal{D} \leftarrow \emptyset$          // initialize set of instance detections on mesh
5  for each image $(I^t, \xi^t)$ in S do
6  |   $(c_1^t, \alpha_1^t, d_1^t), \ldots, (c_{In}^t, \alpha_{In}^t, d_{In}^t) \leftarrow R(I^t)$
7  |   for each detection $o_k^t = (c_k^t, \alpha_k^t, d_k^t)$ do
8  |   |   $(c_k^t, r_k^t, m_k^t) \leftarrow$ projectionAndAggregate $(o_k, I^t, \xi^t; \pi)$
9  |   $\mathcal{D} \leftarrow \mathcal{D} \cup \{(c_1^t, r_1^t, m_1^t), \ldots, (c_{In}^t, r_{In}^t, m_{In}^t)\}$
10 $\mathcal{M}^s \leftarrow$ semanticFusion($\mathcal{D}$)
11 $\mathcal{M}^q \leftarrow 0$
12 for each semantic unique class $s_k$ in $\mathcal{M}^s$ do
13 |   $\mathcal{D}_{s_k} \leftarrow \{o | o \in \mathcal{D}$ s.t. detection o has classId $s_k\}$
14 |   $m_{s_k} \leftarrow (m_i | s_{m_i} = s_k)$
15 |   $\mathcal{M}^q_{s_k} \leftarrow$ instanceFusion($\mathcal{D}_{s_k}, m_{s_k}$)
16 |   $\mathcal{M}^q \leftarrow$ extendIds($\mathcal{M}^q_{s_k}$)
17 return s, q

---

In particular embodiments, semantic fusion may find a partition s of the mesh by aggregating individual detections in D outlined in Algorithm 3. Specifically, the confidence counts $r_k^t$ of each detection may be cumulated over the instance's 3D volume $m_k^t$ (set of face ids on the mesh) in lines 6-8, and a partition may be obtained by assigning each face id to the semantic class with the most counts in line 9. In particular embodiments, the aggregation process may be repeated several times to remove detection instances that are inconsistent (line 7) with the current partition, which may be important for removing false-positive detections by Mask-RCNN. In this work, consistency may be determined by whether more than half of the detection volume $m_k^t$ is assigned the predicted semantic class $c_k^t$ in the partition $M^S$.

In particular embodiments, instance-level segmentation may be more difficult because instance ids between different observations cannot be associated directly. For example, a chair in image A could correspond to any or none of the chairs in image B. More importantly, since the detections are originally derived from 2D images, different detections of the same object instance could correspond to images from different viewpoints and thus have little in overlap on the 3D mesh. To address this challenge, Algorithm 4 may be used to find an instance-level partition $M^q_{sk}$ when given a set of detections $D_{sk}$ for each semantic class $s_k$.

The proposed method may work similarly to expectation maximization. In particular embodiments, the algorithm may iterate between (i) finding a soft assignment $z^t$ for each detection (line 9-14) and (ii) aggregating the assigned detections' confidence counts $\{u_h\}$ to update the instance partition $M^q_{sk}$ (line 15-19). In this work, the intersection over union (IoU) of a detection may be computed with each of the existing partitions (line 11-13). In particular embodiments, to account for a camera's limited field of view, the union calculation between a detection and an instance partition may be restricted to the part of the mesh visible to a detection's corresponding image. A key distinction here from the classical clustering problem may be that an observation t can have multiple correlated detections. As an example and not by way of limitation, Mark-RCNN can find multiple instances of the same semantic class in an image. As another example and not by way of limitation, two detections from the same image may correspond to two separate instances, and thus the soft assignment step in line 14 needs to take into account the IoU between each pair of detections and instance partitions. Furthermore, for semantic classes with instances of large physical size, such as door and wall, each detection typically may only get a small, partial view of an object instance. In particular embodiments, the IoU matrix may also be used as a metric to determine whether multiple partitions should be merged into a single object (line 17-18).

---

ALGORITHM 3: Semantic Fusion

1  Input: Semantic class, masks and confidence scores of instance-level
     detection on a 3D mesh, $\mathcal{D} = \{(c_1^t, r_1^t, m_1^t), \ldots, (c_{In}^t, r_{In}^t, m_{In}^t)\}$
2  Output: Semantic partition of the mesh $\mathcal{M}^s$
3  $\mathcal{M}^s \leftarrow 0$              //initialize a partition vector
4  while not converged do
5  |   $\{u_h \leftarrow 0\}$ // initialize confidence counts for each semantic class h
6  |   for each detection $(o_k^t = (c_k^t, r_k^t, m_k^t))$ in $\mathcal{D}$ do
7  |   |   if first iteration or isConsistent($o_k^t$, s) then
8  |   |   |   $u_{c_k^t} \leftarrow$ cumulateCounts $(u_{c_k^t}, r_1^t, m_1^t)$
9  |   $\mathcal{M}^s \leftarrow$ argmax $(u_1, \ldots, u_s)$
10 return s

---

ALGORITHM 4: Instance Fusion

1  Input: Instance-level detections from a single semantic class,
2    $\mathcal{D}_{s_k} = \{(c_1^t, r_1^t, m_1^t), \ldots, (c_{In}^t, r_{In}^t, m_{In}^t)\}$ s.t. $c_h^t = s_k \forall_t, h$
3    A set of mesh indices $m_{s_k}$ whose semantic class is $s_k$
4  Output: Instance-level partition $\mathcal{M}^q_{s_k}$ for the set of indices $m_{s_k}$
5  $\mathcal{M}^q_{s_k} \leftarrow$ randomPartition($m_{s_k}$)        //initialize instance partition
6  while not converged do
7  |   $\{u_h \leftarrow 0\}$ // initialize confidence counts for each instanceId
       h in q
8  |   S $\leftarrow 0$    // initialize an instance merge/split count matrix
9  |   for each observation t in $\mathcal{D}_{s_k}$ do
10 |   |   iouMat $\leftarrow 0$
11 |   |   for each of kth detection $(c_k^t, r_k^t, m_k^t)$ from observation t do
12 |   |   |   for each instanceId h in $\mathcal{M}^q_{s_k}$ do
13 |   |   |   |   iouMat[k, h] $\leftarrow$ computeIoU($r_k^t, m_k^t, \mathcal{M}^q_{s_k}$, h)
14 |   |   $z^t \leftarrow$ assignDetectionToInstance(iouMat)
15 |   |   for each of kth detection $(c_k^t, r_k^t, m_k^t)$ from observation t do
16 |   |   |   $u_{z_k^t} \leftarrow$ cumulateCounts($u_{z_k^t}, r_k^t, m_k^t$)
17 |   |   S $\leftarrow$ updateMergeSplitCounts(S, iouMat)
18 |   $\{u_h\} \leftarrow$ mergeSplitInstance(S, $\{u_h\}$)
19 |   $\mathcal{M}^q_{s_k} \leftarrow$ arg max $(\{u_h\})$
20 return q

---

In particular embodiments, at the early stage of data collection, available annotated data may be rather limited. The shortage of annotated data may lead to a failure of the fused semantic and instance segmentation from Mask-RCNN to always make correct predictions for every mesh primitive. As an example and not by way of limitation, half of the mesh may not get predictions. However, by using a conservative fusion strategy, most valid predictions may be correct. In particular embodiments, geometry-based segmentation may provide clean and useful predictions on object classes. As an example and not by way of limitation, the structural surfaces, e.g., floors and walls, may be well-segmented. In particular embodiments, the semantic predictions may be conditioned on the geometry segments. That is, in particular embodiments, generating an annotated 3D model by projecting information from segmentations may comprise using geometric information of the objects to project the additional information corresponding to the objects in the 3D model. As an example and not by way of limitation, generating a semantic 3D model by projecting semantic information of a plurality of semantic segmentations may comprise using geometric information to objects to project the semantic information corresponding to the objects in the 3D model.

In particular embodiments, one trivial solution may be to use maximum likelihood (ML) estimation, by assigning each segment the label that dominates the corresponding segment. The ML estimation may not yield optimal solution. The correct labels may be rejected due to a slightly lower occurrence frequency. To resolve this problem, an estimate of the label confidence based on the semantic meaning and the assumption of category world may be used. As an example and not by way of limitation, if the 3D scene represents an apartment in Manhattan, the category world may be a Manhattan world that comprises information corresponding to objects that are typically found within a Manhattan apartment. In particular embodiments, objects may be associated with a plurality of environments. As an example and not by way of limitation, taking a Mask-RCNN segmentation, the gravity direction may first be estimated by taking the dominant segments that are labeled floor. The least square plane fitting may then be performed to obtain the parameter ($n_g$, $d_g$). The estimated plane normal may serve as gravity direction. For primitive $p_i$, that is predicted to be floor, the label confidence may be estimated by $$\eta_i = n_i^T n_g \cdot \exp(-(n_g^T v_i + d_g)^2) \quad (5)$$

As an example and not by way of limitation, assuming the reconstruction may be a Manhattan world, objects that are typically perpendicular to gravity direction, e.g., desk and ceiling, may be assigned confidence $\eta_i = |n_i^T n_g|$. Whereas, objects that are typically parallel to gravity, e.g., wall, doors and monitors, may be assigned confidence $\eta_i = |n_i^T n_g|$ For object classes where the surface orientation may be difficult to be described in by Manhattan world, the confidence may be set to an empirical value which reflect the overall prediction confidence. Using the confidence values, a weighted voting may be performed in label transfer, which may lead to improvements in labelling. In particular embodiments, the system may calculate confidence values for projection of information onto the 3D model. As an example and not by way of limitation, the system may calculate a confidence value that semantic information of an object from a semantic segmentation corresponds to the respective object. That is, a confidence value of whether the object detected is actually indeed a chair. In particular embodiments, the confidence value may be based one whether the semantic information of an object corresponds to an object within a particular environment. As an example and not by way of limitation, within a Manhattan world category, typical objects may be found in that environment. For instance, coffee tables may be common within the Manhattan world category compared to other world categories. Furthermore, certain configurations or styles of a particular object may be found in that environment. As an example and not by way of limitation, modern chairs may be found in the Manhattan world category, but other kinds of chairs may not be common. In particular embodiments, the system may project information onto a 3D model based on whether the determined confidence value exceeds a threshold confidence value. In particular embodiments, the system may discard information if the determined confidence value of the information is less than a threshold confidence value. In particular embodiments, the projection of information towards a 3D model may comprise labeling the corresponding object in the 3D model.

In particular embodiments, the system may use the annotated 3D model to accurately render the 3D scene. As an example and not by way of limitation, the system may correctly identify a rug is separate from the floor and render them separate from one another. In particular embodiments, the system may accurately render augmented reality elements over a real-world view by using the semantic information of objects. As an example and not by way of limitation, the system may generate an augmented reality table lamp that goes over the only table identified within a real-world view. In particular embodiments, the system may use the semantic meaning of objects to filter objects from a virtual reality environment. As an example and not by way of limitation, the user may remove objects from a semantic set "furniture" from the virtual reality environment.

Figure 7:
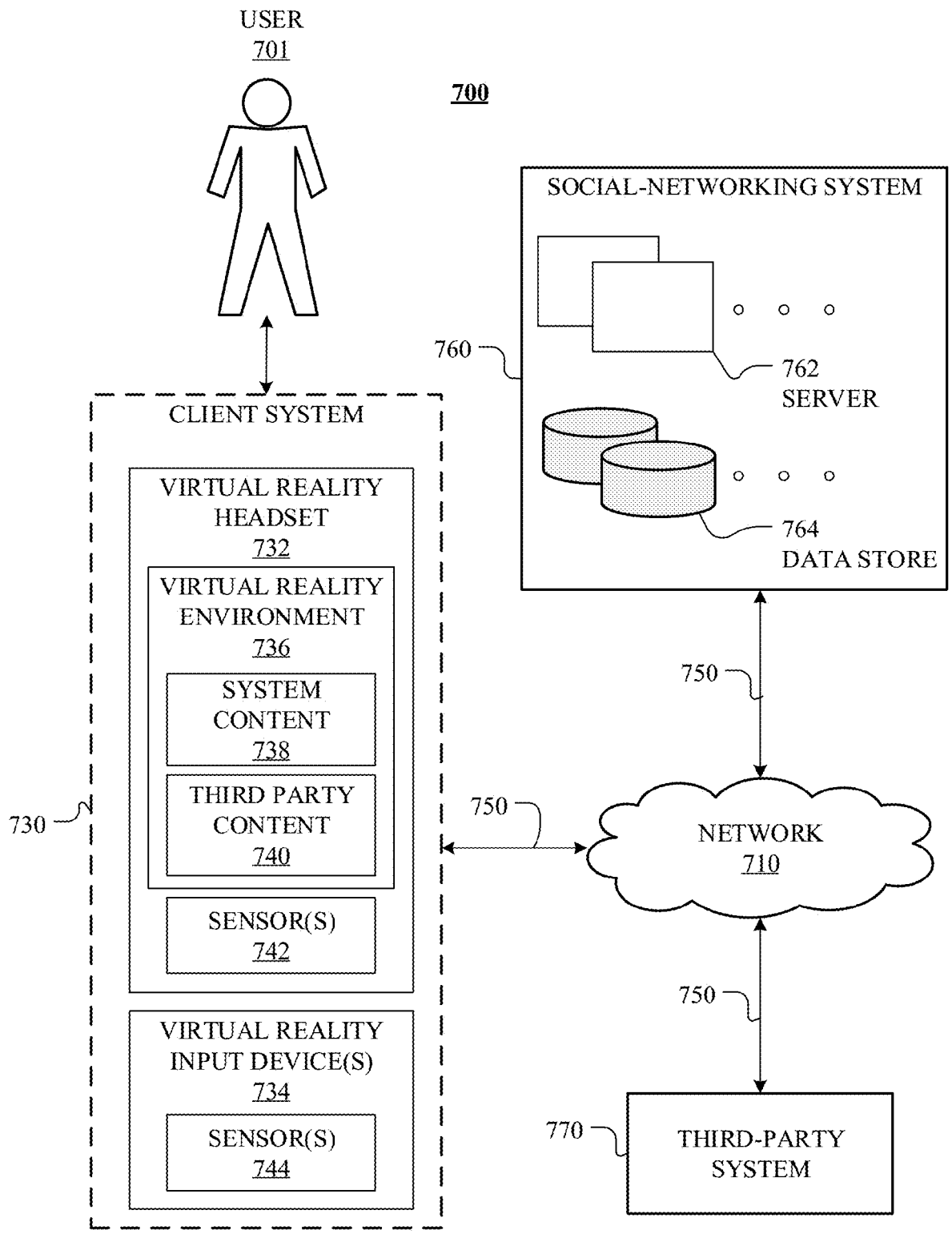
FIG. 7 illustrates an example network environment associated with a virtual reality system.

FIG. 7 illustrates an example network environment 700 associated with a virtual reality system. Network environment 700 includes a user 701 interacting with a client system 730, a social-networking system 760, and a third-party system 770 connected to each other by a network 710. Although FIG. 7 illustrates a particular arrangement of a user 701, a client system 730, a social-networking system 760, a third-party system 770, and a network 710, this disclosure contemplates any suitable arrangement of a user 701, a client system 730, a social-networking system 760, a third-party system 770, and a network 710. As an example and not by way of limitation, two or more of a user 701, a client system 730, a social-networking system 760, and a third-party system 770 may be connected to each other directly, bypassing a network 710. As another example, two or more of a client system 730, a social-networking system 760, and a third-party system 770 may be physically or logically co-located with each other in whole or in part. Moreover, although FIG. 7 illustrates a particular number of users 701, client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple users 701, client systems 730, social-networking systems 760, third-party systems 770, and networks 710.

This disclosure contemplates any suitable network 710. As an example and not by way of limitation, one or more portions of a network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 710 may include one or more networks 710.

Links 750 may connect a client system 730, a social-networking system 760, and a third-party system 770 to a communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout a network environment 700. One or more first links 750 may differ in one or more respects from one or more second links 750.

In particular embodiments, a client system 730 may be an electronic device including hardware, software, or embedded logic components or a combination of two or more such components and capable of carrying out the appropriate functionalities implemented or supported by a client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 730. A client system 730 may enable a network user at a client system 730 to access a network 710. A client system 730 may enable its user to communicate with other users at other client systems 730. A client system 730 may generate a virtual reality environment for a user to interact with content.

In particular embodiments, a client system 730 may include a virtual reality (or augmented reality) headset 732, such as OCULUS RIFT and the like, and virtual reality input device(s) 734, such as a virtual reality controller. A user at a client system 730 may wear the virtual reality headset 732 and use the virtual reality input device(s) to interact with a virtual reality environment 736 generated by the virtual reality headset 732. Although not shown, a client system 730 may also include a separate processing computer and/or any other component of a virtual reality system. A virtual reality headset 732 may generate a virtual reality environment 736, which may include system content 738 (including but not limited to the operating system), such as software or firmware updates and also include third-party content 740, such as content from applications or dynamically downloaded from the Internet (e.g., web page content). A virtual reality headset 732 may include sensor(s) 742, such as accelerometers, gyroscopes, magnetometers to generate sensor data that tracks the location of the headset device 732. The headset 732 may also include eye trackers for tracking the position of the user's eyes or their viewing directions. The client system may use data from the sensor(s) 742 to determine velocity, orientation, and gravitation forces with respect to the headset. Virtual reality input device(s) 734 may include sensor(s) 744, such as accelerometers, gyroscopes, magnetometers, and touch sensors to generate sensor data that tracks the location of the input device 734 and the positions of the user's fingers. The client system 730 may make use of outside-in tracking, in which a tracking camera (not shown) is placed external to the virtual reality headset 732 and within the line of sight of the virtual reality headset 732. In outside-in tracking, the tracking camera may track the location of the virtual reality headset 732 (e.g., by tracking one or more infrared LED markers on the virtual reality headset 732). Alternatively or additionally, the client system 730 may make use of inside-out tracking, in which a tracking camera (not shown) may be placed on or within the virtual reality headset 732 itself. In inside-out tracking, the tracking camera may capture images around it in the real world and may use the changing perspectives of the real world to determine its own position in space.

Third-party content 740 may include a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at a client system 730 may enter a Uniform Resource Locator (URL) or other address directing a web browser to a particular server (such as server 762, or a server associated with a third-party system 770), and the web browser may generate a Hyper Text Transfer Protocol (HTTP) request and communicate the HTTP request to server. The server may accept the HTTP request and communicate to a client system 730 one or more Hyper Text Markup Language (HTML) files responsive to the HTTP request. The client system 730 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 760 may be a network-addressable computing system that can host an online social network. The social-networking system 760 may generate, store, receive, and send social-networking data, such as, for example, user-profile data, concept-profile data, social-graph information, or other suitable data related to the online social network. The social-networking system 760 may be accessed by the other components of network environment 700 either directly or via a network 710. As an example and not by way of limitation, a client system 730 may access the social-networking system 760 using a web browser of a third-party content 740, or a native application associated with the social-networking system 760 (e.g., a mobile social-networking application, a messaging application, another suitable application, or any combination thereof) either directly or via a network 710. In particular embodiments, the social-networking system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, the social-networking system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking system 760, or a third-party system 770 to manage, retrieve, modify, add, or delete, the information stored in data store 764.

In particular embodiments, the social-networking system 760 may store one or more social graphs in one or more data stores 764. In particular embodiments, a social graph may include multiple nodes-which may include multiple user nodes (each corresponding to a particular user) or multiple concept nodes (each corresponding to a particular concept)—and multiple edges connecting the nodes. The social-networking system 760 may provide users of the online social network the ability to communicate and interact with other users. In particular embodiments, users may join the online social network via the social-networking system 760 and then add connections (e.g., relationships) to a number of other users of the social-networking system 760 whom they want to be connected to. Herein, the term "friend" may refer to any other user of the social-networking system 760 with whom a user has formed a connection, association, or relationship via the social-networking system 760.

In particular embodiments, the social-networking system 760 may provide users with the ability to take actions on various types of items or objects, supported by the social-networking system 760. As an example and not by way of limitation, the items and objects may include groups or social networks to which users of the social-networking system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 760 or by an external system of a third-party system 770, which is separate from the social-networking system 760 and coupled to the social-networking system 760 via a network 710.

In particular embodiments, the social-networking system 760 may be capable of linking a variety of entities. As an example and not by way of limitation, the social-networking system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating the social-networking system 760. In particular embodiments, however, the social-networking system 760 and third-party systems 770 may operate in conjunction with each other to provide social-networking services to users of the social-networking system 760 or third-party systems 770. In this sense, the social-networking system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 760 also includes user-generated content objects, which may enhance a user's interactions with the social-networking system 760. User-generated content may include anything a user can add, upload, send, or "post" to the social-networking system 760. As an example and not by way of limitation, a user communicates posts to the social-networking system 760 from a client system 730. Posts may include data such as status updates or other textual data, location information, photos, videos, links, music or other similar data or media. Content may also be added to the social-networking system 760 by a third-party through a "communication channel," such as a newsfeed or stream.

In particular embodiments, the social-networking system 760 may include a variety of servers, sub-systems, programs, modules, logs, and data stores. In particular embodiments, the social-networking system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 760 may also include suitable components such as network interfaces, security mechanisms, load balancers, failover servers, management-and-network-operations consoles, other suitable components, or any suitable combination thereof. In particular embodiments, the social-networking system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 760 to one or more client systems 730 or one or more third-party systems 770 via a network 710. The web server may include a mail server or other messaging functionality for receiving and routing messages between the social-networking system 760 and one or more client systems 730. An API-request server may allow a third-party system 770 to access information from the social-networking system 760 by calling one or more APIs. An action logger may be used to receive communications from a web server about a user's actions on or off the social-networking system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from a client system 730 responsive to a request received from a client system 730. Authorization servers may be used to enforce one or more privacy settings of the users of the social-networking system 760. A privacy setting of a user determines how particular information associated with a user can be shared. The authorization server may allow users to opt in to or opt out of having their actions logged by the social-networking system 760 or shared with other systems (e.g., a third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
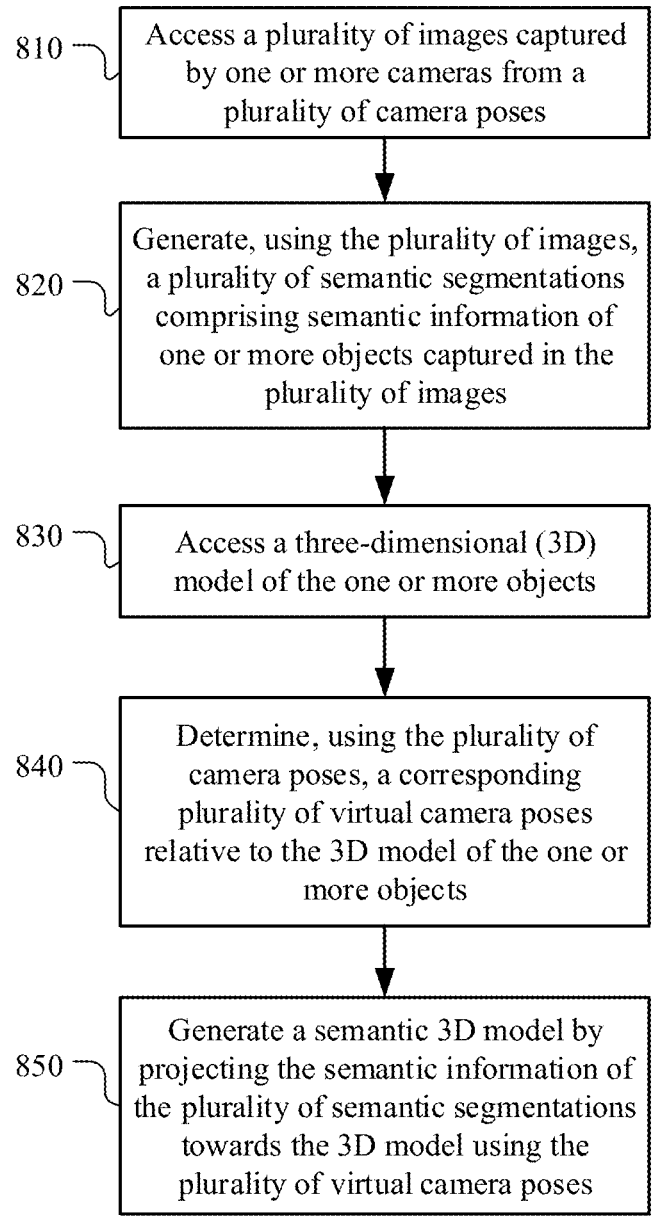
FIG. 8 illustrates an example method for generating a semantic model.

FIG. 8 illustrates an example method 800 for generating a semantic model. In particular embodiments, a virtual reality headset 732 may be used to generate a semantic model. The method may begin at step 810, where a computing system (e.g., virtual reality system) may access a plurality of images captured by one or more cameras from a plurality of camera poses. At step 820, the computing system may generate, using the plurality of images, a plurality of semantic segmentations comprising semantic information of one or more objects captured in the plurality of images. At step 830, the computing system may access a three-dimensional (3D) model of the one or more objects. At step 840, the computing system may determine, using the plurality of camera poses, a corresponding plurality of virtual camera poses relative to the 3D model of the one or more objects. At step 850, the computing system may generate a semantic 3D model by projecting the semantic information of the plurality of semantic segmentations towards the 3D model using the plurality of virtual camera poses. Particular embodiments may repeat one or more steps of the method of FIG. 8, where appropriate. Although this disclosure describes and illustrates particular steps of the method of FIG. 5 as occurring in a particular order, this disclosure contemplates any suitable steps of the method of FIG. 8 occurring in any suitable order. Moreover, although this disclosure describes and illustrates an example method for generating a semantic model, including the particular steps of the method of FIG. 8, this disclosure contemplates any suitable method of generating a semantic model, including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Although this disclosure describes and illustrates processes in context of a virtual reality headset 132 performing various functions, a computing system (e.g., a server embodied as social-networking system 160 or third-party system 170) may handle the processing and send the results to a virtual reality headset 132 and vice versa.

Figure 9:
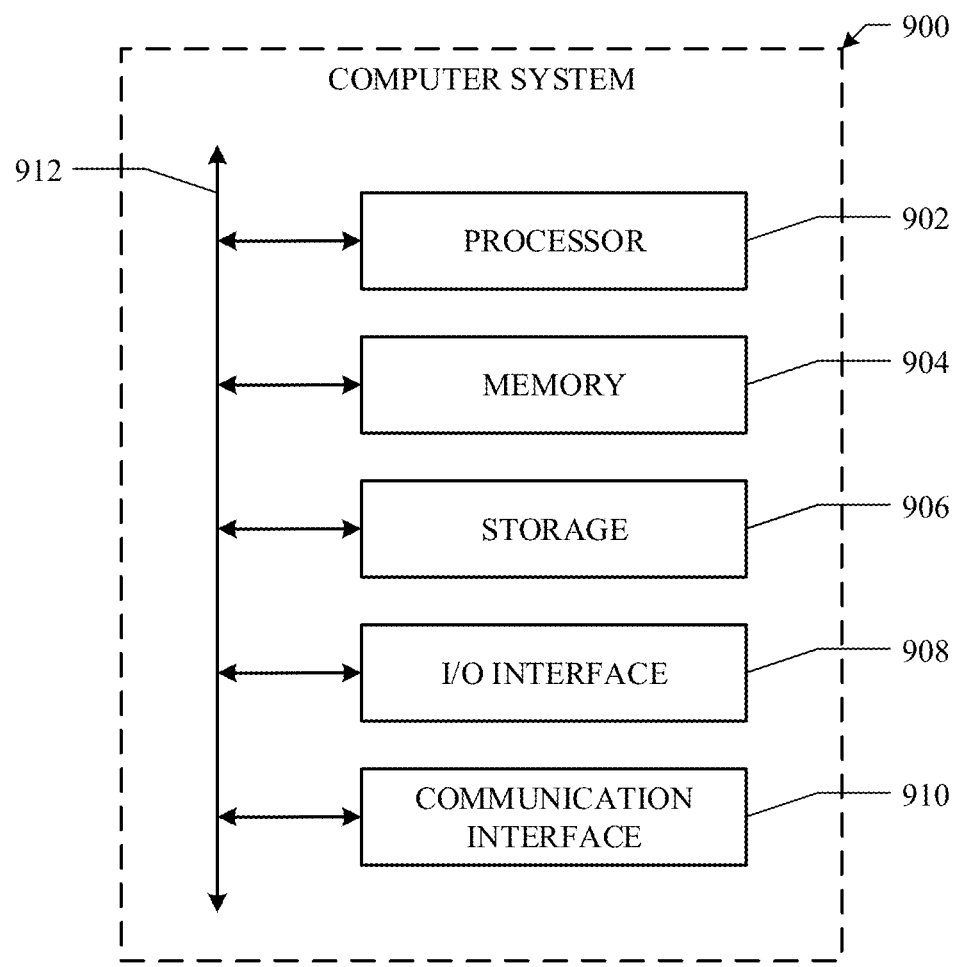
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes and illustrates particular embodiments as providing particular advantages, particular embodiments may provide none, some, or all of these advantages.

What is claimed is:

1. A method comprising, by a computing system:
accessing a plurality of images captured by one or more cameras from a plurality of camera poses;
generating, using the plurality of images, a plurality of semantic segmentations comprising semantic information of one or more objects captured in the plurality of images;
accessing a three-dimensional (3D) model of the one or more objects;
determining, using the plurality of camera poses, a corresponding plurality of virtual camera poses relative to the 3D model of the one or more objects;
generating a semantic 3D model by projecting the semantic information of the plurality of semantic segmentations towards the 3D model using the plurality of virtual camera poses, wherein the semantic information from two or more of the plurality of semantic segmentations are combined to apply to a first object of the one or more objects, and wherein each of the plurality of semantic segmentations corresponds to each of the plurality of virtual camera poses.

2. The method of claim 1, further comprising generating, using the plurality of images, a plurality of geometry-based segmentations comprising geometric information of the one or more objects captured in the plurality of images.

3. The method of claim 2, wherein generating the semantic 3D model by projecting the semantic information of the plurality of semantic segmentations further comprises using the geometric information of the one or more objects to project the semantic information corresponding to the one or more objects captured in the plurality of images.

4. The method of claim 1, further comprising generating, using the plurality of images, a plurality of instance segmentations comprising object identification of the one or more objects captured in the plurality of images.

5. The method of claim 4, further comprising generating an instance 3D model by projecting the object identification of the plurality of instance segmentations towards the 3D model using the plurality of virtual camera poses.

6. The method of claim 5, wherein generating the instance 3D model comprises combining object identification from each of the plurality of instance segmentations to apply to one of the one or more objects.

7. The method of claim 1, further comprising generating a semantic tree based on the semantic information of the one or more objects captured in the plurality of images, wherein the semantic tree comprises a plurality of semantic levels, and wherein each semantic level corresponds to a threshold amount of semantic information.

8. The method of claim 7, wherein the plurality of semantic levels comprises one or more of:
a first semantic level that comprises information corresponding to individual objects of the one or more objects,
a second semantic level that comprises information corresponding to object classes of the one or more objects, and
a third semantic level that comprises information corresponding to a semantic set of the one or more objects.

9. The method of claim 7, wherein projecting the semantic information further comprises projecting the semantic information of a particular semantic level towards the 3D model.

10. The method of claim 1, wherein the 3D model of the one or more objects is generated based on the plurality of images.

11. The method of claim 1, further comprising calculating one or more confidence values that each semantic information of the one or more objects from the plurality of semantic segmentations corresponds to the respective object.

12. The method of claim 11, wherein objects are associated with a plurality of environments, and wherein the one or more confidence values is based on whether the semantic information of the one or more objects corresponds to objects within a particular environment.

13. The method of claim 11, wherein projecting the semantic information of the plurality of semantic segmentations towards the 3D model further comprises:
   determining the confidence value of semantic information for one object exceeds a threshold confidence value; and
   projecting the semantic information towards the 3D model of the respective object in response to the confidence value exceeding the threshold confidence value.

14. The method of claim 11, wherein the semantic information associated with a confidence value less than a threshold confidence value is discarded.

15. The method of claim 1, wherein generating the semantic 3D model comprises combining semantic information from each of the plurality of semantic segmentations to apply to one of the one or more objects.

16. The method of claim 1, wherein projecting the semantic information towards the 3D model comprises adding a label that corresponds to the respective object in the 3D model.

17. One or more computer-readable non-transitory storage media embodying software that is operable when executed to:
   access a plurality of images captured by one or more cameras from a plurality of camera poses;
   generate, using the plurality of images, a plurality of semantic segmentations comprising semantic information of one or more objects captured in the plurality of images;
   access a three-dimensional (3D) model of the one or more objects;
   determine, using the plurality of camera poses, a corresponding plurality of virtual camera poses relative to the 3D model of the one or more objects;
   generate a semantic 3D model by projecting the semantic information of the plurality of semantic segmentations towards the 3D model using the plurality of virtual camera poses, wherein the semantic information from two or more of the plurality of semantic segmentations are combined to apply to a first object of the one or more objects, and wherein each of the plurality of semantic segmentations corresponds to each of the plurality of virtual camera poses.

18. A system comprising: one or more processors; and a non-transitory memory coupled to the processors comprising instructions executable by the processors, the processors operable when executing the instructions to:
   access a plurality of images captured by one or more cameras from a plurality of camera poses;
   generate, using the plurality of images, a plurality of semantic segmentations comprising semantic information of one or more objects captured in the plurality of images;
   access a three-dimensional (3D) model of the one or more objects;
   determine, using the plurality of camera poses, a corresponding plurality of virtual camera poses relative to the 3D model of the one or more objects;
   generate a semantic 3D model by projecting the semantic information of the plurality of semantic segmentations towards the 3D model using the plurality of virtual camera poses, wherein the semantic information from two or more of the plurality of semantic segmentations are combined to apply to a first object of the one or more objects, and wherein each of the plurality of semantic segmentations corresponds to each of the plurality of virtual camera poses.

* * * * *